United States Patent [19]

Pich-LeWinter

[11] Patent Number: 6,078,905
[45] Date of Patent: Jun. 20, 2000

[54] METHOD FOR OPTIMIZING RISK MANAGEMENT

[76] Inventor: Eva Pich-LeWinter, 81900 Mountain View La., La Quinta, Calif. 92253

[21] Appl. No.: 09/049,690

[22] Filed: Mar. 27, 1998

[51] Int. Cl.[7] .................................................. G06F 17/60
[52] U.S. Cl. ................................ 705/36; 705/35; 705/38
[58] Field of Search .................................. 705/35, 36, 38

[56] References Cited

U.S. PATENT DOCUMENTS

| 4,722,055 | 1/1988 | Roberts | 705/36 |
|---|---|---|---|
| 4,799,156 | 1/1989 | Shavit et al. . | |
| 4,953,085 | 8/1990 | Atkins . | |
| 5,148,365 | 9/1992 | Dembo . | |
| 5,220,500 | 6/1993 | Baird et al. . | |
| 5,644,727 | 7/1997 | Atkins . | |
| 5,649,116 | 7/1997 | McCoy et al. | 705/38 |
| 5,745,706 | 4/1998 | Wolfberg et al. | 705/35 |
| 5,784,696 | 7/1998 | Melnikoff | 705/36 |
| 5,806,049 | 9/1998 | Petruzzi | 705/36 |
| 5,812,987 | 9/1998 | Luskin et al. | 705/36 |
| 5,884,287 | 3/1999 | Edesess | 705/36 |
| 5,893,079 | 4/1999 | Cwenar | 705/36 |
| 5,911,135 | 6/1999 | Atkins | 705/36 |

OTHER PUBLICATIONS

"Computers help manage cash flow, portfolios," Caribbean Business, p. 54,581 (abstract), Mar. 5, 1986.

*Primary Examiner*—James P. Trammell
*Assistant Examiner*—Nicholas David Rosen
*Attorney, Agent, or Firm*—Sofer & Haroon, LLP

[57] ABSTRACT

A method for optimizing a rate of return based on a bank's capital and loan products, comprises the creation of a plurality of arrays, comprising a passiva product array, an activa product array, a distribution array and a result array. Each passiva product array signifies a plurality of passiva products having a monetary value and an interest rate associated with it. Each activa product array signifies a plurality of activa products having a monetary value and an interest rate associated with it. The method further assigns to each activa product a plurality of eligible passiva products from the passiva product array, and a pre-determined maximum percentage of the activa product which may be financed by each of the eligible passiva products. For each activa product, enter on the distribution array, a single entry for each eligible passiva product. It calculates a maximum capital amount, a maximum interest amount and an available interest amount for each assignment made in the assigning step, selecting from the distribution array the largest the maximum interest amount.

The entries are processed depending on whether the monetary value of the eligible passiva article is less than the maximum capital amount for the selected single entry.

9 Claims, 4 Drawing Sheets

FIG. 2

| PASSIVA PRODUCT ARRAY ||||
|---|---|---|---|
| PASSIVA | CAPITAL | INTEREST | INTEREST RATE (%) |
| 1001 | 500,00 | 5,000 | 1 |
| 1002 | 1,000,000 | 20,000 | 2 |
| 1003 | 200,000 | 6,000 | 3 |
| 1004 | 300,000 | 12,000 | 4 |

FIG. 3

| ACTIVA PRODUCT ARRAY ||||
|---|---|---|---|
| ACTIVA | CAPITAL | INTEREST | INTEREST RATE (%) |
| 1000 | 1,000,000 | 80,000 | 8 |
| 2000 | 1,000,000 | 70,000 | 7 |

FIG. 4

| TABLE 9RE REFINANCING MIX |||||||
|---|---|---|---|---|---|---|
| BU | PROD. ACT | PROD. PASS | VON | BIS | VERSION | PERCENT(%) |
| 01 | 00001000 | 00001001 | 010192 | 311292 | 01 | 10.0 |
| 01 | 00001000 | 00001002 | 010192 | 311292 | 01 | 20.0 |
| 01 | 00001000 | 00001003 | 010192 | 311292 | 01 | 30.0 |
| 01 | 00001000 | 00001004 | 010192 | 311292 | 01 | 40.0 |
| 01 | 00002000 | 00001001 | 010192 | 311292 | 01 | 40.0 |
| 01 | 00002000 | 00001002 | 010192 | 311292 | 01 | 30.0 |
| 01 | 00002000 | 00001003 | 010192 | 311292 | 01 | 20.0 |
| 01 | 00002000 | 00001004 | 010192 | 311292 | 01 | 10.0 |
| 99 | 00001000 | 00001001 | 010192 | 311292 | 01 | 35.2 |
| 99 | 00001000 | 00001002 | 010192 | 311292 | 01 | 36.4 |
| 99 | 00001000 | 00001003 | 010192 | 311292 | 01 | 24.3 |
| 99 | 00001000 | 00001004 | 010192 | 311292 | 01 | 4.1 |

FIG. 5

DISTRIBUTION ARRAY

| ACTIVA | PASSIVA | MIX CAPITAL | MIX INTEREST | AVAILABLE CAPITAL | AVAILABLE INTEREST | DELTA INTEREST |
|---|---|---|---|---|---|---|
| 2000 | 1002 | 300,000 | 15,000 | 300,000 | 15,000 | 5 |
| 1000 | 1004 | 400,000 | 16,000 | 300,000 | 12,000 | 4 |
| 1000 | 1002 | 200,000 | 12,000 | 200,000 | 12,000 | 6 |
| 1000 | 1003 | 300,000 | 15,000 | 200,000 | 10,000 | 5 |
| 2000 | 1003 | 200,000 | 8,000 | 200,000 | 8,000 | 4 |
| 1000 | 1001 | 100,000 | 7,000 | 100,000 | 7,000 | 7 |
| 2000 | 1004 | 100,000 | 3,000 | 100,000 | 3,000 | 3 |

FIG. 7

RESULT ARRAY

| ACTIVA | PASSIVA | MIX CAPITAL | MIX INTEREST | AVAILABLE CAPITAL | AVAILABLE INTEREST | DELTA INTEREST |
|---|---|---|---|---|---|---|
| 2000 | 1002 | 300,000 | 15,000 | 300,000 | 15,000 | 5 |
| 1000 | 1004 | 400,000 | 16,000 | 300,000 | 12,000 | 4 |
| 1000 | 1002 | 200,000 | 12,000 | 200,000 | 12,000 | 6 |
| 1000 | 1003 | 300,000 | 15,000 | 200,000 | 10,000 | 5 |
| 2000 | 1001 | 400,000 | 24,000 | 400,000 | 24,000 | 6 |

METHOD FOR OPTIMIZING RISK MANAGEMENT

FIELD OF THE INVENTION

This invention relates to risk allocation in banking industries and more specifically to a method for optimizing the rate of return based on a bank's deposit and loan accounts.

BACKGROUND OF THE INVENTION

Management of risk is fundamental to the business of banking and is an essential part of a bank's economic strategy. Banks face various risks and the success of a bank's operations relies on its ability to optimize the rates of return for the capital available to the bank based on pre-determined risk management constraints.

In the normal course of banking operations, a bank's earnings depend on, among other things, the difference in interest rates between that which the bank collects from its activa products (a product is the aggregate of similar accounts, i.e.—all residential loan accounts with an interest rate of 10% might collectively be referred to as a single loan product, or likewise for loans having similar risk characteristics) and that paid by the bank via the passiva products it uses to finance the activa products. As defined in the text "Economic Terminology" by authors Renner and Sachs, which is incorporated by reference herein, "activa" is equivalent to the term 'loan function', and "passiva" is equivalent to the term 'deposit function'. Additionally, the use of the term "financing" is used to describe the activity of a bank in using deposit functions to sell loan functions.

Ideally, a bank would simply allocate the capital from its lowest interest passiva product (i.e.—savings accounts, or the like, for which the bank pays the customer, for example, 1% interest) to finance its highest interest activa product (i.e.—loan accounts, or the like, for which the bank collects, for example, 10% interest). In this situation, the bank would make the most profit because the interest collected by the bank would maximally exceed the interest paid. However, this method is not typically possible because of risk management constraints imposed upon the bank. These risk management constraints require the bank to use capital in such a way as to minimize (or at least lessen to acceptable levels) the risks to the capital.

For instance, a bank takes a risk when providing a loan that the customer receiving it will default on the loan. If such a default takes place, the funds used to finance that loan is lost or may only be partially recoverable. Since the funds used to finance that loan originated as capital in the passiva accounts belonging presumably to other customers of the bank, a default may adversely affect the passiva account holder. In order to protect against this situation, both a governmental entity and/or the bank's management can impose constraints on the way in which the bank can finance the loans it makes. Typically, the constraints state which passiva products, and what percentage of each passiva product, can be used to finance each activa product. In this manner, an activa product can be financed by the capital from a number of different passiva products, and the percentage of the activa product which may permissibly be financed by each of the passiva products is pre-determined. Extending the example of the previous paragraph, risk management constraints may permit i.e.—only 25% of the 10% interest rate loans to be financed by the 1% interest rate savings accounts, thus minimizing the risk to the capital in the 1% savings accounts.

These pre-determined limits potentially conflict with the bank's profit-maximizing objective. The bank can not automatically finance its highest interest-paying activa products with its lowest interest-bearing passiva products. In order to operate optimally, however, a bank must utilize a method which enables it to maximize its profit while staying within the risk management constraints imposed upon it.

Therefore, there exists a need for a method which ensures that a bank finances its activa products with capital from passiva products so as to maximize profits while still operating within any imposed risk management constraints.

SUMMARY OF THE INVENTION

The present invention is a computer system that employs a method for optimizing the rate of return of a bank. Several arrays are created in order to efficiently tabulate rates of return to be achieved by allocating capital from passiva products to finance activa products. One such array stores information corresponding to passiva products, another stores information corresponding to activa products. Utilizing a financing mix, which details what percentage of each activa product may be financed by each passiva product, a distribution array is created which preferably stores each activa product, the passiva products associated with each activa product, the difference in interest rates between each product, the maximum capital from each passiva product which can permissibly be utilized to finance each activa product, and the profit to be made by the bank if it allocates said allowable maximum capital. In one embodiment of the invention, the distribution array is sorted by the maximum interest amount column and the entry with the highest maximum interest amount is analyzed first. For said entry, a comparison is made to determine whether the capital required to achieve the highest maximum interest amount is actually available in the passiva product. If it is, the entry is added to a result array, which is an array that represents the optimal allocation of capital. Said entry is then deleted from the distribution array, the passiva and activa product arrays are adjusted to reflect the allocated capital, and the distribution array is re-sorted. These steps are repeated until there is a complete allocation of the capital. If the capital required to achieve the highest maximum interest amount is not actually available in the passiva product, then the maximum capital amount for the entry is adjusted to equal the available interest amount, the distribution array is re-sorted, and the entry with the next highest maximum interest amount is analyzed.

BRIEF DESCRIPTION OF THE DRAWINGS

These and other objects, features and advantages of the invention will be more readily apparent from the following descriptions of the preferred embodiment of the invention in which:

FIG. 2 depicts a passiva product array, in accordance with one embodiment of the invention;

FIG. 3 depicts an activa product array, in accordance with one embodiment of the invention;

FIG. 4 depicts a financing mix table, in accordance with one embodiment of the invention;

FIG. 5 depicts a distribution array, in accordance with one embodiment of the invention;

FIG. 7 depicts a result array, in accordance with one embodiment of the invention.

DETAILED DESCRIPTION OF THE INVENTION

Figure 1:
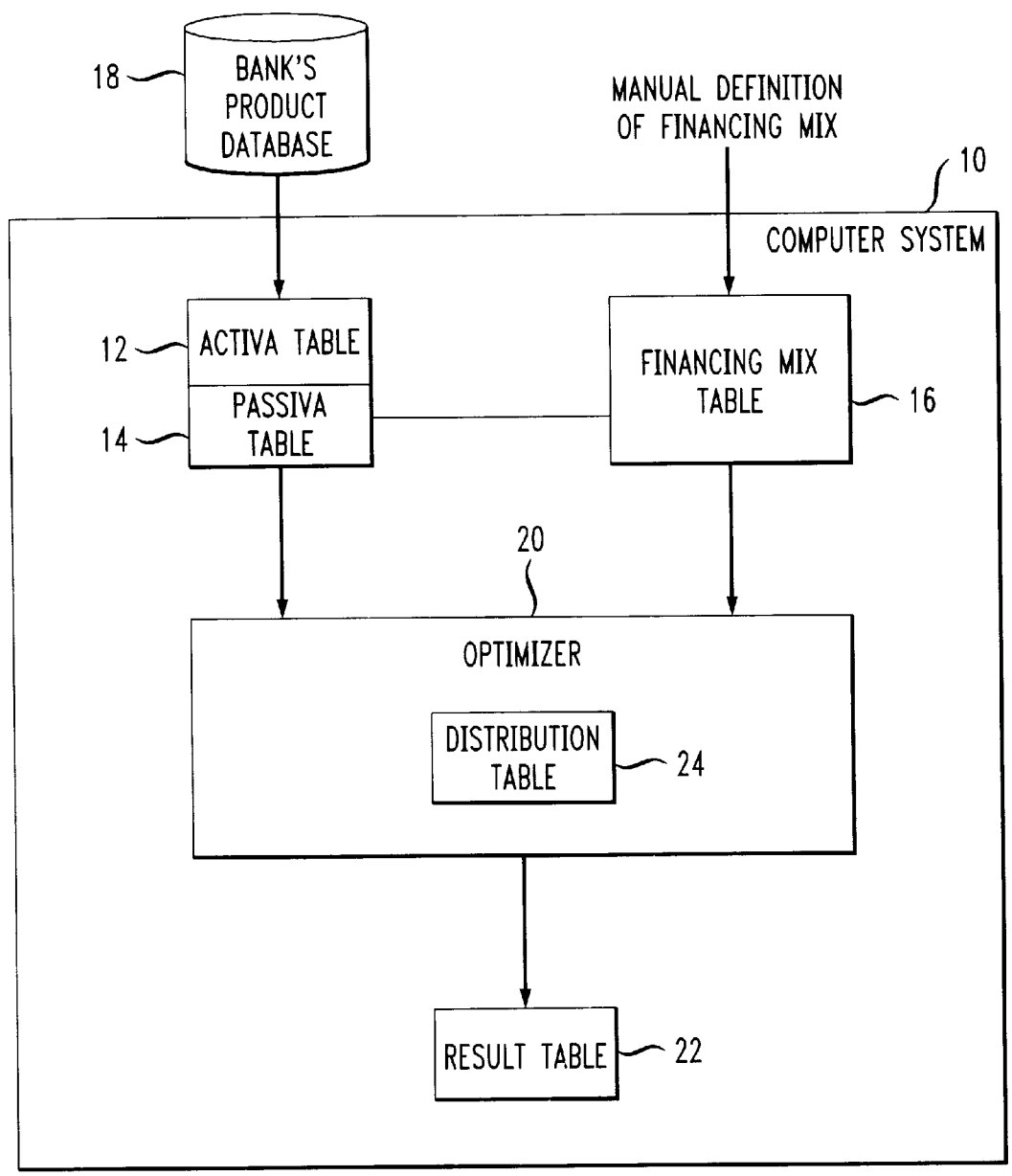
FIG. 1 depicts the basic structure of the financial management system of the present invention, in accordance with one embodiment of the invention.

The present invention optimizes the rate of return of a bank which is operating under risk management constraints, by providing a method which can be utilized by the bank to ensure that it is allocating the capital from its passiva products in the most profitable way. The present invention details the creation of arrays, or tables, which organize and tabulate product information to optimize its use.

Computer system 10 is configured to browse a bank's product database. An activa table 12 and a passiva table 14 are defined by memory buffer spaces in computer system 10. Tables 12 and 14 are configured to store information provided by a bank's product database 18. A financing mix table 16 is defined by another memory buffer space in computer system 10. Table 16 is configured to receive information relating to the bank's financing mix. In one embodiment of the invention, this information may be entered manually. In another embodiment of the invention, financing mix information may be automatically browsed by computer system 10. Computer system 10 includes an optimizer 20 which is configured to receive information from tables 12, 14 and 16 respectively. Optimizer 20 includes a distribution table 24 storing distribution data as will be explained in more detail hereinafter. Computer system 10 also includes a result table 22, which is configured to store optimized allocations of activa and passiva accounts, which is accessible to user of computer system 10, for example, via a display screen or a printer.

During operation, as shown in the figure, the bank's product database 18 is examined by the software browser of computer system 10. The system searches database 18 and enters into activa table 12 and passiva table 14 those activa and passiva products, respectively, which it finds. Each table would therefore have separate entries for each product offered by the bank. Financing mix table 16, which contains information obtainable from a manual definition of the financing mix, details the constraints the bank operates under when allocating capital from its passiva products to its activa products. An example of financing mix table 16 is shown in FIG. 4, as will be explained in more detail hereinafter. Computer system 10 utilizes activa product array 12, passiva product array 14 and financing mix table 16 to set up distribution array 24. An example of distribution array 24 is shown in FIG. 5, as will be explained in more detail hereinafter. Optimizer 20 performs a series of calculations and operations on the entries in distribution array 24 in order to produce result table 22, which shows the optimal allocation of capital. An example of result table 22 is shown in FIG. 7. The calculations and operations are described later in this section and include steps 112 through 130 in the flow chart illustrated in FIG. 6.

FIG. 2 shows passiva product array 14, which is created as a result of computer system's 10 search of bank's product database 18. The search of database 18 for the passiva product information is also shown in step 106 in the flow chart in FIG. 6. The passiva product array 14 contains information on each of the passiva products which the bank offers to its customers. Passiva products are those products which constitute assets for the bank. Examples of passiva products are savings and checking accounts, because the bank's customers deposit the funds which the bank uses for capital. For making these deposits and to encourage further deposits, the bank typically pays its customers interest based on a percentage of the amount deposited in the bank. FIG. 2 shows an identifier used to identify (and distinguish between) specific passiva products, the monetary value, or capital, associated with each passiva product, the interest rate associated with each passiva product and the available interest amount associated with each passiva product.

FIG. 3 shows activa product array 12, which is also created as a result of computer system's 10 search of the bank's product database 18. The search of database 18 for the activa product information is also shown in step 104 of the flow chart in FIG. 6. Activa product array 12 contains information on each of the activa products which the bank offers to its customers. Activa products are those products which constitute liabilities for the bank. Examples of activa products are loans made by the bank, because the bank is owed the funds which it has loaned out. For making these loans, the bank typically charges its customers interest based on a percentage of the amount loaned. This interest rate is usually significantly higher than the interest rate which the bank pays to its passiva product customers. FIG. 3 shows an identifier used to identify (and distinguish between) specific activa products, the monetary value, or capital, associated with each activa product, the interest rate associated with each activa product and the annual interest associated with each activa product.

FIG. 5 shows a distribution array 24. The distribution array 24 incorporates information from both passiva product array 14 and activa product array 12, as well as information from other sources. One such other source is financing mix table 16. An example of financing mix table 16 is shown in FIG. 4. The financing mix designates what percentage of each activa product may be financed by each passiva product. These percentages are imposed on the bank in order to lessen the risk to the passiva products which the bank is utilizing to finance its activa products. Such risk management constraints can be imposed by a governmental entity or by the bank's own management. Each line of the financing mix table 16 contains, at a minimum, the identifier of the activa product, the identifier of a passiva product which has been pre-determined as eligible to finance that particular activa product, and the maximum percentage of the activa product which may be financed by that particular passiva product.

Figure 6:
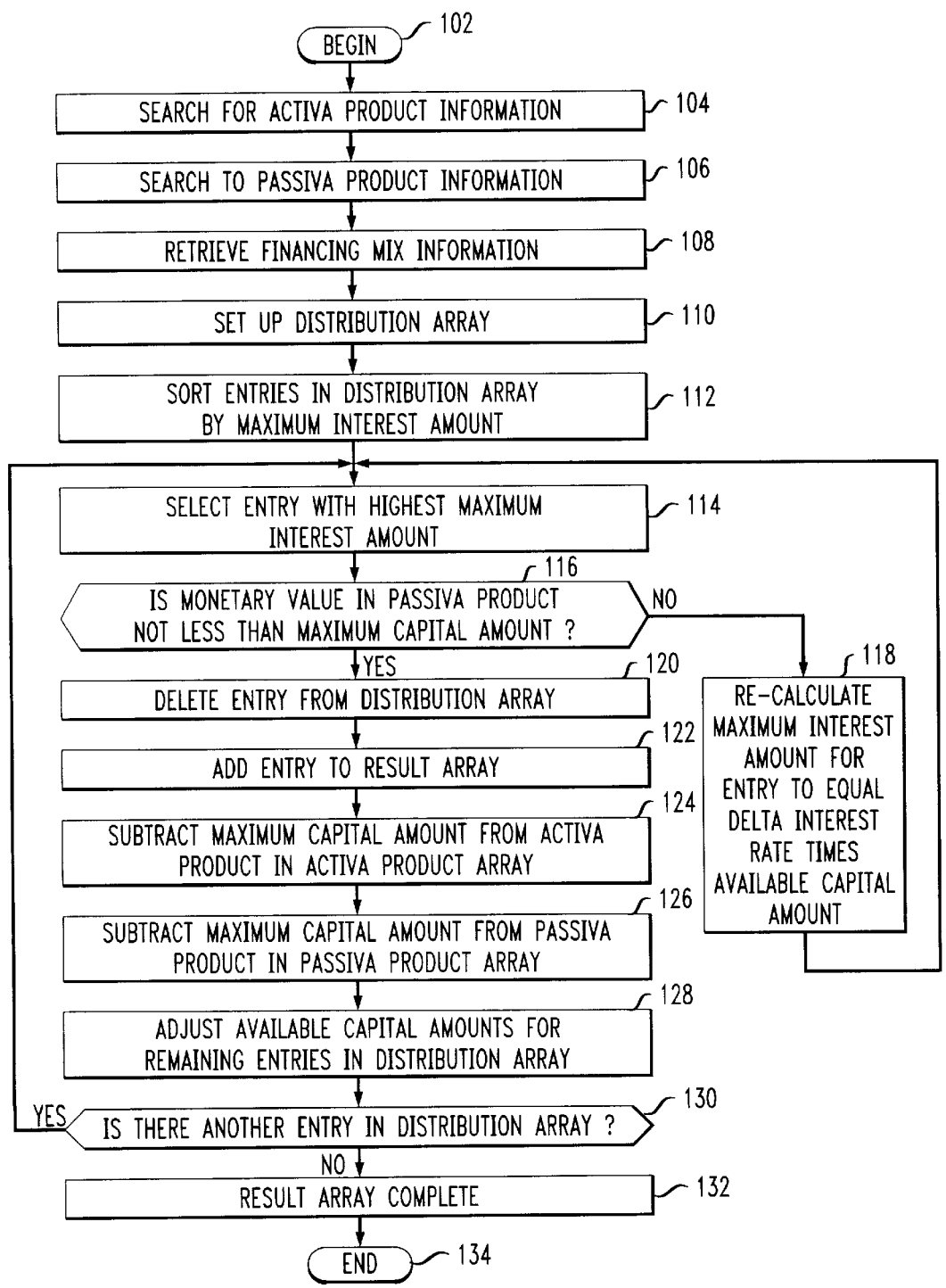
FIG. 6 depicts a flow chart, in accordance with one embodiment of the invention.

FIG. 6 is a flow chart that illustrates the operation of optimizer 20 in computer system 10, in accordance with one embodiment of the invention. At step 102, computer system 10 begins the optimization process. At steps 104 and 106, computer system 10 retrieves information corresponding to activa and passiva products from bank's product database 18 as discussed before. At step 108, information is retrieved from the financing mix table in order to set up the distribution array 24. Specifically, the maximum percentage of the activa product which may be financed by that particular passiva product is utilized in the distribution array. At step 110, computer system 10 sets up distribution array 24. Distribution array 24 uses the same activa and passiva product pairings as the financing mix table 16. In other words, just as financing mix table 16 contains an entry for each activa product paired with a passiva product which is eligible to finance it, distribution array 24 contains an entry corresponding to the same product pair. For each such pair in distribution array 24, the maximum percentage specified in financing mix table 16 is multiplied by the monetary value of the activa product. This amount, also known as the maximum capital amount, represents the greatest permissible contribution which can be made from a particular passiva product to a particular activa product under the risk management constraints, not taking into consideration the actual capital which is available in the passiva account or the desirability of making the contribution.

In one embodiment of the invention, distribution array 24 includes the difference between the interest rates of the activa product and the passiva product of each pair. The interest rate of the passiva product can be found in its corresponding entry in passiva product array 14. Similarly, the interest rate of the activa product can be found in its corresponding entry in activa product array 12. The difference between these two interest rates is termed delta interest rate and is simply found by subtracting the interest rate of the passiva product (which is presumed to be the lower of the two interest rates) from the interest rate of the activa product. Multiplying the delta interest rate by the maximum capital amount for each entry, the maximum interest amount is obtained. This maximum interest amount represents the profit which the bank would earn if it financed the activa product with the maximum amount of capital from the passiva product permitted by the risk management constraints imposed on the bank. In one embodiment of the invention, at step 112, the maximum interest amount is sorted in distribution array 24. However, many times this maximum interest amount can not be realized because the maximum capital amount from the corresponding passiva product is not available.

Thus, distribution array 24 preferably includes an available capital amount and an available interest amount corresponding to each product pair. The available capital amount would reflect the actual monetary value of the passiva product, and the available interest amount would represent the profit which the bank would earn if it financed the activa product with the actual monetary value of the passiva product. The available capital amount is ideally designated as the maximum capital amount of the same entry, not to exceed the actual monetary value of the passiva product. For instance, if a passiva product, such as 1002 in FIG. 2, has capital of $1,000,000 and the maximum capital amount which can permissibly be allocated from that passiva product to a particular activa product, such as 1000 in FIG. 2, is $400,000, then the available capital amount would ideally be designated as $400,000. Otherwise, if a passiva product, such as 1003 in FIG. 2, only has capital of $200,000 and the maximum capital amount which can permissibly be allocated from that passiva product to a particular activa product, such as 1000 in FIG. 2, is $400,000, then the available capital amount would be designated as $200,000 (so as not to exceed the actual monetary value of the passiva product).

Once distribution array 24 contains an entry for each activa product paired with each passiva product which is eligible to finance it, the entries are advantageously sorted. In accordance with one embodiment of the invention, the array is sorted in descending order based on the maximum interest amount. This method of sorting is shown in step 112 of the flow chart in FIG. 6. In this manner, the first entry in distribution array 24 is the entry which corresponds to the greatest profit which the bank could potentially earn on any one allocation of finds. The second entry in the distribution array would be the entry which corresponds to the second greatest profit, and so on until the last entry which corresponds to the entry offering the least profit to the bank. After sorting all of the entries in distribution array 24, at step 114, computer system 10 selects the first entry (i.e.—the most profitable) in order to evaluate the desirability of making the allocation designated by that entry.

It should be noted that the sorting step is not an essential step of the present invention. It is also possible for the program to select the most profitable entry without first sorting all of the entries in the distribution array. The sorting step does, however, allow for an easier and more efficient selection of the entries to be evaluated.

Once an entry is selected for evaluation, the maximum capital amount for that entry is compared to the actual monetary value of the corresponding passiva product at decision step 116. If the actual monetary value of the passiva product is equal to or exceeds the maximum capital amount for that entry, this signifies that enough capital exists in the passiva product in order to make the desired allocation, thus rendering the highest profit. Once the allocation is made, this entry is then deleted from distribution array 24, as illustrated by step 120 of the flow chart in FIG. 6, and is added to result array 22, as illustrated by step 122 of the flow chart. An example of result array 22 is shown in FIG. 7. Result array 22, when complete, provides the user of the system described in the present invention with the optimal way to allocate the bank's capital.

After a selected entry has been evaluated and has been deleted from distribution array 24 and added to result array 22, passiva and activa product arrays, 14 and 12, must be adjusted to reflect the allocation of the capital. In passiva product array 14, the monetary value of the particular passiva product which was the subject of the evaluation is reduced by an amount equal to the allocation at step 126. This insures that, in subsequent evaluations of different entries, the maximum capital amounts are compared to the correct monetary values of the passiva products, not the original monetary values before the allocations were made. Similarly, in activa product array 12, the capital corresponding to the activa product which was the subject of the evaluation is reduced, at step 124, by the same amount, also to insure that subsequent comparisons are made to the correct monetary value.

If distribution array 24 also includes the available capital amounts and the available interest amounts, then it may be desirable to adjust these items. For instance, if the allocation of funds by one entry would reduce the available capital amount in another entry, it is advantageous to reflect the change in the available capital amount to insure that subsequent comparisons to the available capital are made to the correct amount. For instance, if a particular passiva product, such as 1001 in FIG. 2, has an available capital amount of $500,000 and an allocation, such as 2000/1001 in FIG. 7, is made equaling $400,000, then any other entries in the distribution array 24 which involve the same passiva product, such as 1000/1001 in FIG. 5, must be adjusted to show that the available capital amount is only $100,000. In this example, no adjustment was necessary because the available capital amount for entry 1000/1001 in FIG. 5 was already only $100,000. If, however, the available capital amount for entry 1000/1001 in FIG. 5 had originally been $200,000, this value would have been reduced to $100,000 to reflect the allocated capital. This adjustment is illustrated by step 128 of the flow chart in FIG. 6.

At step 130, computer system 10 determines whether distribution array 24 includes additional entries. If so, it goes to step 114 and evaluates the next entry in distribution array 24. This next entry is the entry corresponding to the next greatest profit which can potentially be realized by the bank, and if distribution array 24 has been sorted, will be the first entry in distribution array 24 after the deletion of the previously allocated entry. If distribution array 24 has not been sorted, then the present method searches the remaining entries for the greatest maximum interest amount. Once selected, a similar evaluation is made upon the entry as was made upon prior entries, i.e.—the maximum capital amount is compared to the available capital amount to determine whether there exists in the passiva product sufficient capital to make the desired allocation. If there is sufficient capital, the allocation is made, the entry is deleted from distribution array 24 and added to result array 22, and the program returns to distribution array 24 to make a further selection. This process is repeated until allocations have been made so as to provide financing to all of the activa products. Once completed, result array 22 will instruct the bank how to allocate the capital from its passiva products so as to optimize it profits. Step 132 of the flow chart in FIG. 6 illustrates the completion of result array 22, whereupon step 134 illustrates the completion of the program.

The described method deviates slightly when, upon evaluating the selected entry from distribution array 24, it is determined that the actual available capital amount does not equal or exceed the maximum capital amount for that entry at decision step 116. In this case, the passiva product does not have sufficient funds to make the desired, most-profitable allocation. When this occurs, computer system 10 goes to step 118 to readjust the entry. In one embodiment of the invention, at step 118, the entry will be re-sorted in distribution array 24, utilizing its available interest amount rather than its maximum interest amount. The re-calculation of the maximum interest amount by multiplying the difference in interest rates by the available capital amount is illustrated by step 118 of the flowchart in FIG. 6. Therefore, the entry would not be evaluated when first selected, but would be re-selected, in accordance with step 114 of the flow chart, at a subsequent time when other selected entries having greater profits have been successfully allocated.

Once all entries in the distribution array have been evaluated in accordance with steps 114–130, system 10 goes to step 132 to complete result array 22 and the optimization process at step 134.

While there has been shown and described a particular embodiment of the invention, it will be obvious to those skilled in the art that changes and modification can be made therein without departing from the invention, and therefore, the appended claims shall be understood to cover all such changes and modifications as fall within the true spirit and scope of the invention.

We claim:

1. A method for optimizing a rate of return based on a bank's capital and loan products, comprising:

(a) creating a plurality of arrays, comprising a passiva product array, an activa product array, a distribution array, and a result array;

(b) each said passiva product array signifying a plurality of passiva products, each said passiva product having a monetary value and an interest rate associated with it;

(c) each said activa product array signifying a plurality of activa products, each said activa product having a monetary value and an interest rate associated with it;

(d) assigning to each said activa product a plurality of eligible passiva products from said passiva product array, and a pre-determined maximum percentage of said activa product which may be financed by each of said eligible passiva products;

(e) for each said activa product, entering on said distribution array a single entry for each said eligible passiva product;

(f) calculating a maximum capital amount, a maximum interest amounts and an available interest amount for each assignment made in said assigning step;

(g) selecting from said distribution array the largest said maximum interest amount;

(h) if said monetary value of said eligible passiva product is not less than said maximum capital amount for said selected single entry, deleting said selected single entry from the distribution array and adding it to said result array, subtracting said maximum capital amount for said selected single entry from said monetary value of said passiva product in said passiva product array and from said monetary value of said activa product in said activa array;

(i) if said monetary value of said eligible passiva product is less than said maximum capital amount for said selected single entry, adjusting a profit amount of said selected single entry by multiplying the difference in said interest rates between said activa product and said eligible passiva product by said monetary value of said eligible passiva product;

(j) repeating said steps (g)–(i) until monetary value from said plurality of passiva products has been allocated to each one of said plurality of activa products: and (k) allocating said monetary value of said plurality of passiva products according to said result array, so as to optimize said rate of return based on said bank's capital and loan products.

2. The method of claim 1, wherein calculating said maximum capital amount further comprises multiplying said monetary value of said activa product by said pre-determined maximum percentage of said activa product which may be financed by each of said eligible passiva products.

3. The method of claim 1, wherein calculating said maximum interest amount further comprises multiplying said maximum capital amount by said difference in said interest rates between each said activa product and each of its said eligible passiva products.

4. The method of claim 1, wherein calculating said available interest amount further comprises multiplying said monetary value of said eligible passiva product by said difference in said interest rates between said activa product and said eligible passiva product.

5. The method of claim 1, further comprising, after step (f), entering in said distribution array said maximum capital amount, said maximum interest amount and said available interest amount.

6. The method of claim 1, further comprising, after step (f), entering in said distribution array said monetary value of said eligible passiva product.

7. The method of claim 1, further comprising, after step (f), entering in said distribution array said monetary value of said eligible passiva product, and after step (h), subtracting said maximum capital amount from said monetary value in each said single entry in said distribution array having the same said eligible passiva product.

8. The method of claim 1, further comprising sorting said single entries in said distribution array prior to each selection step.

9. The method of claim 1, further comprising repeating said selecting step until said monetary value for all said activa products equals zero.

* * * * *